United States Patent
Wilson et al.

(10) Patent No.: US 9,514,562 B2
(45) Date of Patent: Dec. 6, 2016

(54) PROCEDURAL PARTITIONING OF A SCENE

(71) Applicant: DreamWorks Animation LLC, Glendale, CA (US)

(72) Inventors: Robert Giles Wilson, Burbank, CA (US); Evan P. Smyth, Glendale, CA (US); Mark Lee, Glendale, CA (US); Max Requenes, Glendale, CA (US); Peter McNerney, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 246 days.

(21) Appl. No.: 13/844,113

(22) Filed: Mar. 15, 2013

(65) Prior Publication Data

US 2014/0267344 A1    Sep. 18, 2014

(51) Int. Cl.
| | | |
|---|---|---|
| *G06T 13/00* | (2011.01) | |
| *G06T 13/80* | (2011.01) | |
| *G06T 13/20* | (2011.01) | |
| *G06T 15/50* | (2011.01) | |
| *G06T 19/00* | (2011.01) | |

(52) U.S. Cl.
CPC ............... *G06T 13/80* (2013.01); *G06T 13/20* (2013.01); *G06T 15/506* (2013.01); *G06T 19/00* (2013.01); *G06T 2210/61* (2013.01)

(58) Field of Classification Search
None
See application file for complete search history.

(56) References Cited

U.S. PATENT DOCUMENTS

| | | |
|---|---|---|
| 4,922,413 A | 5/1990 | Stoughton et al. |
| 5,307,295 A | 4/1994 | Taylor et al. |

(Continued)

FOREIGN PATENT DOCUMENTS

| | | |
|---|---|---|
| EP | 1918880 A2 | 5/2008 |
| EP | 1918881 A2 | 5/2008 |

(Continued)

OTHER PUBLICATIONS

Josie Wernecke, "The Inventor Mentor: Programming Object-Oriented 3D Graphics with Open Inventor, Release 2", 1994, Chapters 1, 3 and 9.*

(Continued)

*Primary Examiner* — David C Chu
(74) *Attorney, Agent, or Firm* — Morrison & Foerster LLP

(57) ABSTRACT

Systems and methods for partitioning a set of animation objects using a node in a render setup graph are provided. The render setup graph may be used to configure and manage lighting configuration data as well as external processes used to render the computer-generated image. The render setup graph may include a dependency graph having nodes interconnected by edges along which objects and object configuration data may be passed between nodes. The nodes may be used to provide a source of objects and object configuration data, configure visual effects of an object, partition a set of objects, call external processes, perform data routing functions within the graph, and the like. The objects can be partitioned based on attributes of the objects and associated configuration data. In this way, the render setup graph may advantageously be used to organize configuration data and execution of processes for rendering an image.

30 Claims, 9 Drawing Sheets

(56) References Cited

U.S. PATENT DOCUMENTS

| | | | |
|---|---|---|---|
| 5,329,360 A | 7/1994 | Gillard et al. |
| 5,438,661 A | 8/1995 | Ogawa |
| 5,675,752 A | 10/1997 | Scott et al. |
| 5,808,617 A | 9/1998 | Kenworthy et al. |
| 5,808,625 A | 9/1998 | Picott et al. |
| 5,896,139 A | 4/1999 | Strauss |
| 5,936,628 A | 8/1999 | Kitamura et al. |
| 5,982,389 A | 11/1999 | Guenter et al. |
| 5,986,667 A | 11/1999 | Jevans |
| 6,154,215 A | 11/2000 | Hopcroft et al. |
| 6,243,856 B1 | 6/2001 | Meyer et al. |
| 6,252,608 B1 | 6/2001 | Snyder et al. |
| 6,263,103 B1 | 7/2001 | Freeman et al. |
| 6,263,496 B1 | 7/2001 | Meyer et al. |
| 6,272,650 B1 | 8/2001 | Meyer et al. |
| 6,496,190 B1 | 12/2002 | Driemeyer et al. |
| 6,556,200 B1 | 4/2003 | Pfister et al. |
| 6,563,504 B1 | 5/2003 | Rose et al. |
| 6,611,262 B1 | 8/2003 | Suzuki |
| 6,760,485 B1 | 7/2004 | Gilman et al. |
| 6,919,891 B2 | 7/2005 | Schneider et al. |
| 7,174,039 B2 | 2/2007 | Koo et al. |
| 7,414,626 B1 | 8/2008 | Picott |
| 7,439,982 B2 | 10/2008 | Deniau et al. |
| 7,548,238 B2 | 6/2009 | Berteig et al. |
| 7,911,472 B2 | 3/2011 | Harper |
| 7,920,143 B1 | 4/2011 | Haratsch et al. |
| 8,009,176 B2 | 8/2011 | Zimmer |
| 8,259,110 B1 | 9/2012 | Carr et al. |
| 8,274,506 B1 | 9/2012 | Rees |
| 8,339,402 B2 | 12/2012 | Henson et al. |
| 8,352,397 B2 | 1/2013 | Rubin et al. |
| 8,352,443 B1 | 1/2013 | Polson et al. |
| 8,369,564 B2 | 2/2013 | Hervas et al. |
| 8,612,485 B2 | 12/2013 | Selan et al. |
| 8,624,898 B1* | 1/2014 | Bugaj et al. ............ 345/440 |
| 8,773,433 B1 | 7/2014 | Smyrl |
| 2001/0027388 A1 | 10/2001 | Beverina et al. |
| 2002/0063704 A1 | 5/2002 | Sowizral et al. |
| 2002/0099684 A1 | 7/2002 | Ardoin et al. |
| 2002/0128841 A1 | 9/2002 | Kibre et al. |
| 2002/0140707 A1 | 10/2002 | Samra et al. |
| 2002/0163518 A1 | 11/2002 | Rising, III et al. |
| 2002/0188613 A1 | 12/2002 | Chakraborty et al. |
| 2003/0156117 A1 | 8/2003 | Higuchi et al. |
| 2004/0052450 A1 | 3/2004 | Morrison |
| 2004/0109501 A1 | 6/2004 | Wollborn |
| 2004/0160445 A1 | 8/2004 | Whatmough |
| 2004/0189668 A1* | 9/2004 | Beda et al. ............. 345/619 |
| 2004/0194020 A1 | 9/2004 | Beda et al. |
| 2004/0222989 A1 | 11/2004 | Zhang et al. |
| 2004/0222992 A1 | 11/2004 | Calkins et al. |
| 2005/0039176 A1* | 2/2005 | Fournie ............. 717/156 |
| 2005/0110790 A1 | 5/2005 | D'Amora |
| 2005/0140672 A1 | 6/2005 | Hubbell |
| 2005/0140694 A1 | 6/2005 | Subramanian et al. |
| 2005/0248565 A1 | 11/2005 | Grassia et al. |
| 2005/0253839 A1 | 11/2005 | Bugaj et al. |
| 2005/0256950 A1 | 11/2005 | Suzuki |
| 2005/0262470 A1 | 11/2005 | Gavrilov |
| 2006/0176403 A1 | 8/2006 | Gritton et al. |
| 2007/0080964 A1 | 4/2007 | Kainz et al. |
| 2007/0176926 A1 | 8/2007 | Garcia et al. |
| 2007/0185881 A1 | 8/2007 | Vienneau et al. |
| 2008/0028414 A1 | 1/2008 | Couture-Gagnon et al. |
| 2008/0049033 A1 | 2/2008 | Yang |
| 2008/0109717 A1 | 5/2008 | Krauter |
| 2008/0117216 A1 | 5/2008 | Dorie |
| 2008/0122838 A1 | 5/2008 | Hoover et al. |
| 2008/0231633 A1 | 9/2008 | Keller et al. |
| 2008/0238916 A1 | 10/2008 | Ghosh et al. |
| 2008/0278482 A1 | 11/2008 | Farmanbar et al. |
| 2009/0021513 A1 | 1/2009 | Joshi et al. |
| 2009/0027380 A1 | 1/2009 | Rajan et al. |
| 2010/0079462 A1 | 4/2010 | Breeds et al. |
| 2010/0086200 A1 | 4/2010 | Stankiewicz et al. |
| 2010/0123723 A1 | 5/2010 | Collard et al. |
| 2010/0134501 A1 | 6/2010 | Lowe et al. |
| 2010/0177104 A1 | 7/2010 | Dufour et al. |
| 2010/0214284 A1 | 8/2010 | Rieffel et al. |
| 2010/0214313 A1 | 8/2010 | Herman et al. |
| 2010/0289804 A1 | 11/2010 | Jackman et al. |
| 2010/0302249 A1 | 12/2010 | Fowler et al. |
| 2010/0322358 A1 | 12/2010 | Drumm et al. |
| 2011/0090236 A1 | 4/2011 | Calsyn et al. |
| 2011/0106843 A1 | 5/2011 | Pan et al. |
| 2011/0181606 A1 | 7/2011 | Sumner et al. |
| 2011/0182479 A1 | 7/2011 | Sese et al. |
| 2011/0206200 A1 | 8/2011 | Sovio et al. |
| 2011/0234587 A1 | 9/2011 | Maigret et al. |
| 2011/0316854 A1 | 12/2011 | Vandrovec |
| 2012/0095745 A1 | 4/2012 | Le Guevel-Scholtens et al. |
| 2012/0113125 A1 | 5/2012 | Guerrab et al. |
| 2012/0166446 A1 | 6/2012 | Bowman et al. |
| 2012/0280991 A1 | 11/2012 | Maloney et al. |
| 2012/0280995 A1 | 11/2012 | Anderson |
| 2012/0284664 A1 | 11/2012 | Zhao |
| 2013/0063460 A1 | 3/2013 | Marison et al. |
| 2013/0063472 A1 | 3/2013 | Marison et al. |
| 2013/0090850 A1 | 4/2013 | Mays |
| 2013/0120421 A1 | 5/2013 | Maguire |
| 2013/0120422 A1 | 5/2013 | Rao et al. |
| 2013/0127891 A1 | 5/2013 | Kim et al. |
| 2014/0035908 A1 | 2/2014 | Powell et al. |
| 2014/0059564 A1 | 2/2014 | Vigneras et al. |
| 2014/0108485 A1 | 4/2014 | Geibel et al. |
| 2015/0042654 A1 | 2/2015 | Segasby et al. |

FOREIGN PATENT DOCUMENTS

| | | |
|---|---|---|
| EP | 1990776 A2 | 11/2008 |
| EP | 2187355 A1 | 5/2010 |
| EP | 2779100 A1 | 9/2014 |
| WO | 01/63561 A1 | 8/2001 |
| WO | 2006094199 A2 | 9/2006 |
| WO | 2007005739 A2 | 1/2007 |
| WO | 2007/146800 A2 | 12/2007 |
| WO | 2007146800 A3 | 11/2008 |
| WO | 2010035141 A2 | 4/2010 |
| WO | 2012/174128 A1 | 12/2012 |
| WO | 2013036691 A1 | 3/2013 |

OTHER PUBLICATIONS

Notice of Allowance received for U.S. Appl. No. 13/831,482, mailed on Mar. 4, 2015, 5 pages.
Non-Final Office Action received for U.S. Appl. No. 13/844,497, mailed on Mar. 13, 2015, 21 pages.
International Search Report and Written Opinion received for PCT Patent Application No. PCT/US2014/026792, mailed on Aug. 11, 2014, 7 pages.
International Search Report & Written Opinion received for PCT Patent Application No. PCT/US2014/026799, mailed on Sep. 26, 2014, 11 pages.
Non Final Office Action received for U.S. Appl. No. 13/843,695, mailed on Oct. 22, 2014, 16 pages.
Non Final Office Action received for U.S. Appl. No. 13/844,424, mailed on Oct. 28, 2014, 10 pages.
Barrett et al., "A Monotonic Superclass Linearization for Dylan", Oopsla 96, Jun. 28, 1996, pp. 69-82.
Ex-Parte Quayle Action received for U.S. Appl. No. 13/831,482, mailed on Nov. 24, 2014, 7 pages.
Invitation to pay additional fees received for PCT Patent Application No. PCT/US2014/026799, mailed on Jul. 25, 2014, 2 pages.
Final Office Action received for U.S. Appl. No. 13/843,695, mailed on Feb. 23, 2015, 21 pages.
Non Final Office Action received for U.S. Appl. No. 13/843,980, mailed on Feb. 5, 2015, 15 pages.
Non Final Office Action received for U.S. Appl. No. 13/844,016, mailed on Feb. 5, 2015, 23 pages.

(56) References Cited

OTHER PUBLICATIONS

Non-Final Office Action received for U.S. Appl. No. 13/844,363, mailed on Feb. 24, 2015, 9 pages.
Non-Final Office Action received for U.S. Appl. No. 13/831,309, mailed on Feb. 24, 2015, 8 pages.
Rossler et al., "Dynamic Shader Generation for Flexible Multi-Volume Visualization", IEEE Pacific Visualisation Symposium, Mar. 2008, pp. 17-24.
"Intro to Animation", Power Point Presentation, available online at <http://visservices.sdsc.edu/courses/maya/spring06/introtoanim.ppt>, accessed on Apr. 30, 2013, 32 pages.
"JUNG (Java Universal Network/Graph) Framework Manual, Filtering", available online at <http://jung.sourceforge.net/doc/manual.html#filter>, retrieved on Apr. 30, 2013, 13 pages.
"WebKit Coordinated Graphics System", available online at <http://trac.webkit.org/wiki/CoordinatedGraphicsSystem>, retrieved on Apr. 30, 2013, 9 pages.
Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.
Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.
Lu et al., "Knowledge-Based Digital Media Processing: Generic Object Registration using Multiple Hypotheses Testing in Partition Trees", IEE Proc.-Vis. Image Signal Process, vol. 153, No. 3, Jun. 2006, pp. 323-330.
Oishi et al., "Parallel Alignment of a Large Number of Range Images", Proceedings of the Fourth International Conference on 3-D Digital Imaging and Modeling (3DIM'03), IEEE Computer Society, 2003, 8 pages.
Techfuels, "The Lighting Scene in 3D Animation", available online at <http://www.techfuels.com/applications/9895-lighting-scene-3d-animation.html>, retrieved on Apr. 30, 2013, 3 pages.
Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.
Van Der Beek, Jelle, "Dependency Graphs in Games", Gamasutra The Art & Business of Making Games, available at <http://www.gamasutra.com/view/feature/131221/dependency_graphs_in_games.php?print=1>, accessed on Apr. 30, 2013, 15 pages.
Extended European Search Report received for European Patent Application No. 14160117.9, mailed on May 26, 2014, 7 pages.
Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, Retrieved on Oct. 18, 2013, 61 pages.
Schmalstieg et al., "Modeling and Rendering of Outdoor Scenes for Distributed Virtual Environments", ACM VRST '97 Lausanne Switzerland, 1997, pp. 209-215.
Sun Microsystems, "Reusing Scene Graphs", Java 3D API Specification, Available at <http://docs.oracle.com/cd/E17802_01/j2se/javase/technologies/desktop/java3d/forDevelopers/j3dguide/SceneGraphSharing.doc.html>, Jun. 1999, pp. 1-11.
Non-Final Office Action received for U.S. Appl. No. 13/844,380, mailed on Apr. 2, 2015, 9 pages.
Final Office Action received for U.S. Appl. No. 13/844,424, mailed on Apr. 7, 2015, 10 pages.
Wernecke, Josie, "The Inventor Mentor: Programming Object-Oriented 3D Graphics with Open Inventor™, Release 2", Addison-Wesley Publishing Company, Chapter 3. Nodes and Groups, 1994.
Notice of Allowance received for U.S. Appl. No. 13/831,309, mailed on Jul. 21, 2015, 14 pages.
Final Office Action received for U.S. Appl. No. 13/844,363, mailed on Aug. 6, 2015, 12 pages.
Notice of Allowance received for U.S. Appl. No. 13/844,380, mailed on Jul. 17, 2015, 7 pages.
Extended European Search Report (includes Supplementary European Search Report and Search Opinion) received for European Patent Application No. 14160119.5, mailed on Jun. 30, 2015, 11 pages.
"Robocopy.exe Robust File Copy Utility Version XP010", Microsoft Corporation, 2003, pp. 1-35.
"Open Inventor toolkit Tutorial", Chapter 3. Nodes and Groups and Chapter 4. Cameras and Lights, Available online at <http://www-evasion.imag.fr/Membres/Francois.Faure/doc/inventorMentor/sgi_html/ch03.html>, Retrieved on Oct. 18, 2013, 61 pages.
Bederson et al., "Toolkit Design for Interactive Structured Graphics", IEEE Transactions on Software Engineering, vol. 30, No. 8, Aug. 2004, pp. 535-546.
Qi-Cheng et al., "High-Extensible Scene Graph Framework Based on Component Techniques", Journal of Zhejiang University Science A, vol. 7, No. 7, 2006, pp. 1247-1252.
Dobos et al., "3D Revision Control Framework", Web3D, 2012, pp. 121-129.
Dollner et al., "Object-Oriented 3D Modelling, Animation and Interaction", The Journal of Visualization and Computer Animation, vol. 8, 1997, pp. 33-64.
Tobler, Robert F., "Separating Semantics from Rendering: A Scene Graph Based Architecture for Graphics Applications", Visual Computer, vol. 27, 2011, pp. 687-695.
Final Office Action received for U.S. Appl. No. 13/831,309, mailed on Jun. 5, 2015, 8 pages.
Non-Final Office Action received for U.S. Appl. No. 13/831,482, mailed on Apr. 20, 2015, 8 pages.
Merriam-Webster Dictionary "Perspective", Available at <www.merriam-webster.com/dictionary/perspective>, Retrieved on Apr. 22, 2016, 8 pages.
"Perspective—Definition of Perspective by the Free Dictionary", Available at <www.thefreedictionary.com/perspective>, Retrieved on Apr. 22, 2016, 5 pages.
"Play/Stop 3ds Max Autodesk Knowledge Network", Autidesk Inc., Available at <http://knowledge.autodesk.com/support/3ds-max/learn-explore/caas/CloudHelp/cloudhelp/2015/ENU/3DSMax/files/GUID-4DC44019-A6BA-40F4-B860-520AD1B16AB7-htm.html>, Dec. 17, 2014, 4 pages.
Notice of Allowance received for U.S. Appl. No. 13/831,482, mailed on Aug. 31, 2015, 5 pages.
Advisory Action received for U.S. Appl. No. 13/843,695, mailed on Aug. 5, 2015, 2 pages.
Non-Final Office Action received for U.S. Appl. No. 13/843,695, mailed on Nov. 23, 2015, 27 pages.
Advisory Action received for U.S. Appl. No. 13/843,980, mailed on Jan. 5, 2016, 8 pages.
Final Office Action received for U.S. Appl. No. 13/843,980, mailed on Sep. 2, 2015, 20 pages.
Non-Final Office Action received for U.S. Appl. No. 13/843,980, mailed on Mar. 16, 2016, 24 pages.
Notice of Allowance received for U.S. Appl. No. 13/844,016, mailed on Aug. 21, 2015, 10 pages.
Notice of Allowance received for U.S. Appl. No. 13/844,016, mailed on Oct. 22, 2015, 2 pages.
Notice of Allowance received for U.S. Appl. No. 13/844,424, mailed on Nov. 5, 2015, 10 pages.
Advisory Action received for U.S. Appl. No. 13/844,497, mailed on Mar. 16, 2016, 4 pages.
Final Office Action received for U.S. Appl. No. 13/844,497, mailed on Sep. 28, 2015, 28 pages.
Extended European Search Report received for European Patent Application No. 14159918.3, mailed on Nov. 12, 2015, 8 pages.
Extended European Search Report received for European Patent Application No. 141600023, mailed on Dec. 3, 2015, 10 pages.
Extended European Search Report received for European Patent Application No. 14160115.3, mailed on Jul. 28, 2015, 6 pages.
Fisher et al., "Characterizing Structural Relationships in Scenes Using Graph Kernels", ACM Siggraph 2011 papers, XP055222613, Aug. 7, 2011, 11 pages.
International Preliminary Report on Patentability received for PCT Patent Application No. PCT/US2014/026792, mailed on Sep. 24, 2015, 6 pages.

(56) References Cited

OTHER PUBLICATIONS

International Preliminary Report on Patentability received for PCT Patent Application No. PCT/US2014/026799, mailed on Sep. 24, 2015, 8 pages.
Walker, ACJ, "CGTalk—Viewing Animation in Multiple Viewports", CGSociety, Available at <http://forums.cgsociety.org/archive/index.php?t-512252.html>, Jun. 28, 2007, 3 pages.
Young et al., "Cantata: Visual Programming Environment for the Khoros System", Computer Graphics. ACM. US. vol. 29, No. 2, XP000520212. ISSN:0097-8930, DOI: 10.1145/204362.204367, May 1995, pp. 22-24.
Adamsen, Mikkel, "ReRendering", available at <http://image.diku.dk/projects/media/mikkel.adamsen.07.pdf>, Sep. 24, 2007, 19 pages.
Barzel, Ronen, "Lighting Controls for Computer Cinematograph", Journal of Graphics Tools, vol. 2, No. 1, Jan. 1, 1997, pp. 1-19.
Gould, David, "Complete Maya Programming—An Extensive Guide to MEL and C++API", The Morgan Kaufmann Series in Computer Graphics and Geometric Modelling, 2003, pp. 51 pages.
Pellacini et al., "A User Interface for Interactive Cinematic Shadow Design", ACM Transactions on Graphics, vol. 21. No. 3, Jul. 1, 2002, pp. 563-566.
Ragan-Kelley et al., "The Lightspeed Automatic Interactive Lighting Preview System", ACM Transactions on Graphics, vol. 26, No. 3, Jul. 2007, pp. 25.1-25.11.
Watt et al., "LibEE: A Multithreaded Dependency Graph for Character Animation", proceedings of the Digital Production Symposium on DIGIPRO '12, 2012, pp. 59-66.
Extended European Search Report (includes Partial European Search Report and Search Opinion) received for European Patent Application No. 14159965.4, mailed on Jul. 20, 2016, 16 pages.
Extended European Search Report received for European Patent Application No. 14159928.2, mailed on Mar. 22, 2016, 15 pages.
Final Office Action received for U.S. Appl. No. 13/843,695, mailed on Apr. 19, 2016, 9 pages.
Notice of Allowance received for U.S. Appl. No. 13/844,363, mailed on Jun. 16, 2016, 7 pages.
Partial European Search Report received for European Patent Application No. 14159965.4, mailed on Apr. 1, 2016, 9 pages.
Bittner et al., "Coherent Hierarchical Culling: Hardware Occlusion Queries Made Useful", Eurographics, vol. 23, No. 3, Sep. 2004, 10 pages.
Partial European Search Report received for European Patent Application No. 14714566.8, mailed on Aug. 1, 2016, 5 pages.
Extended European Search Report received for European Patent Application No. 14160025.4, mailed on Aug. 9, 2016, 6 pages.

* cited by examiner

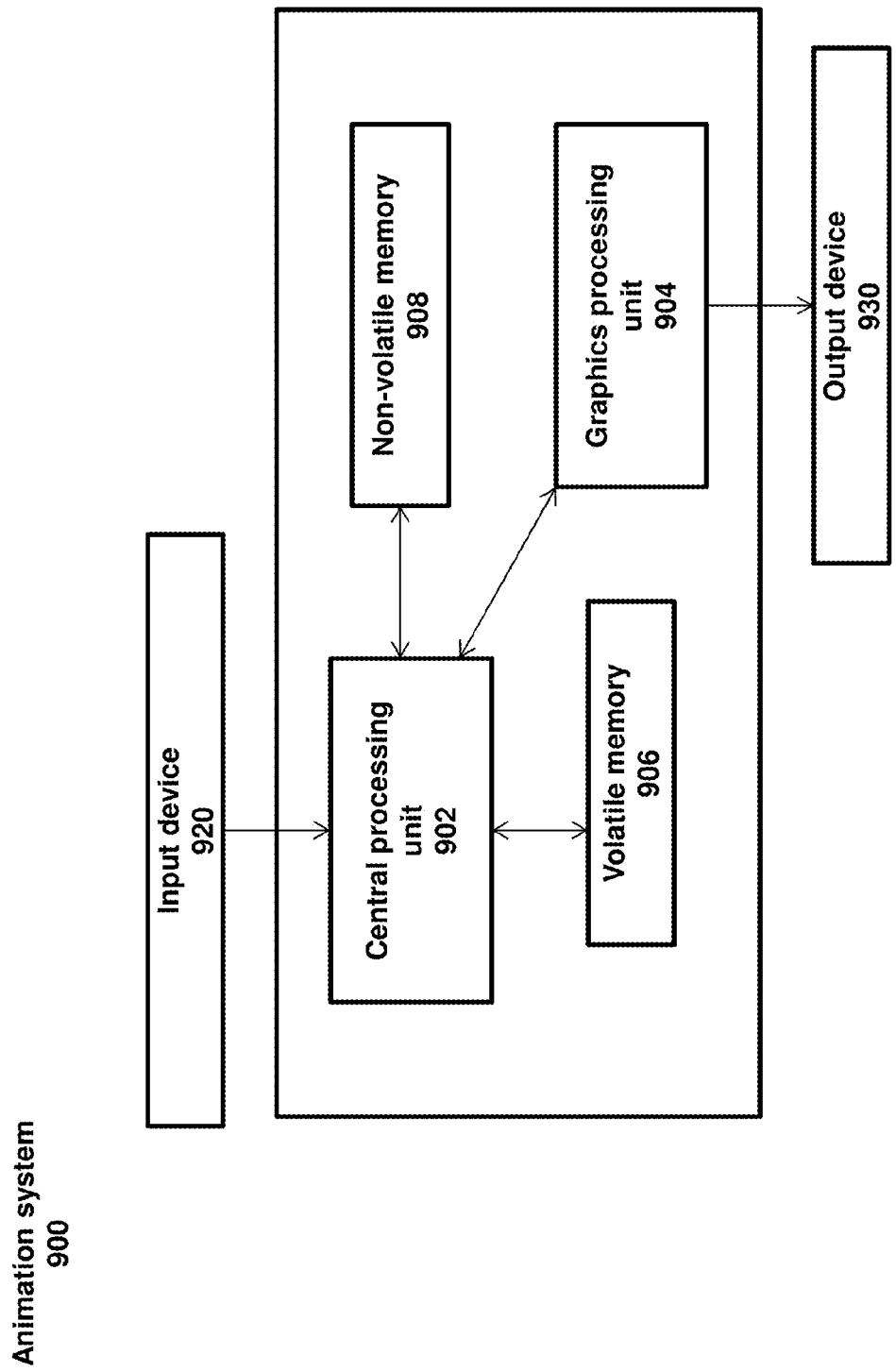

US 9,514,562 B2

PROCEDURAL PARTITIONING OF A SCENE

BACKGROUND

1. Field

The present disclosure relates to computer-generated animation and, more specifically, to rendering a computer-generated animation using a dependency graph.

2. Related Art

A computer-generated animation is typically created by rendering a sequence of images, with each image depicting a computer-generated scene composed of one or more computer-generated objects (e.g., a character, tree, table, chair, etc.). Light sources, materials, textures, and other visual effects may be associated with the computer-generated objects to create realistic lighting effects for the computer-generated scene. Properly implementing these visual effects can involve configuring large amounts of data used by numerous external processes, such as rendering, shading, rasterizing, shadowing calculations, reflection calculations, transmission calculations, and the like. Managing the configuration data and external processes can be difficult due to the large amount of data and large number of processes required to produce a computer-generated animation and the complex dependencies that exist between them.

For example, film production lighting typically requires a lighter to configure tens to thousands of outputs to be used by external processes for each shot in a computer-generated animation. These outputs may depend from multiple inputs, which may in turn depend from other inputs and/or external processes. For example, the lighter may be required to select one or more light sources (e.g., ambient light source, point light source, spotlight, or the like) used to illuminate the computer-generated scene as well as configure surface shaders to simulate the optical properties (e.g., color, texture, specular properties, and the like) of each surface of each computer-generated object in that scene. Thus, the appearance of an object in the scene depends on, among other things, the one or more light sources and the outputs of the external shading processes used to simulate the optical properties of the various surfaces of that object.

As more light sources and objects are added to the scene, the dependencies between the configuration data and the external processes become exceedingly complex. Moreover, complex assignments of lighting configurations may be used such that some lighting configurations are assigned on an object-by-object basis, while others are assigned to groups of objects identified by a shared attribute. For example, a spotlight may be associated with only the main character in the foreground of the scene, causing the spotlight to illuminate the main character and not the other objects in the scene. The scene may also include an ambient light associated with all objects in the scene. This approach provides the animator or lighter with more flexibility when configuring the visual effects in a scene, but may result in increased complexity for the lighter since traditional lighting work-flows require the lighter to commit the intricate data dependencies between the external processes to memory. Additionally, traditional lighting work-flows require the lighter to explicitly modify the lighting configurations as objects in a scene are edited, added, or removed, creating a substantial amount of work for the lighter.

It is therefore desirable to create a system for configuring and managing the configuration data and external processes used to render a computer-generated animation.

SUMMARY

Processes for partitioning a set of animation objects using a dependency graph are described. One example process may include accessing a dependency graph comprising a plurality of interconnected nodes, wherein a first node of the plurality of interconnected nodes comprises a first partition criterion; accessing a set of animation objects identified by an input of the first node; comparing the set of animation objects to the first partition criterion; when one or more objects in the set of animation objects satisfy the first partition criterion, generating a first subset of those one or more objects that satisfy the first partition criterion; and when one or more objects in the set of animation objects do not satisfy the first partition criterion, generating a second subset of those one or more objects that do not satisfy the first partition criterion.

In some examples, the method may further include comparing the first subset to a second partition criterion, wherein the first node further comprises the second partition criterion; when one or more objects in the first subset satisfy the second partition criterion, generating a third subset of those one or more objects in the first subset that satisfy the second partition criterion; and when one or more objects in the first subset do not satisfy the second partition criterion, generating a fourth subset of those one or more objects in the first subset that do not satisfy the second partition criterion.

In some examples, the set of animation objects may include a first set of animation objects when the input of the first node identifies the first set of animation objects as being the set of animation objects to be accessed. Alternatively, the set of animation objects may include a second set of animation objects when the input of the first node identifies the second set of animation objects as being the set of animation objects to be accessed.

In some examples, the method may further include selecting a visual effect for the first subset; and rendering an image based on the first subset and the selected visual effect, wherein the plurality of interconnected nodes further comprises: a second node comprising the visual effect; and a third node comprising an instruction to render the image based on the first subset and the selected visual effect. In some examples rendering the image may include rendering the image using a result from one or more of a rendering process, translucency process, shading process, or rasterizing process. In some examples, an input of the second node identifies the first subset from a first output of the first node. In some examples, an input of the third node identifies the first subset and the selected visual effect from an output of the second node.

In some examples, the visual effect may include a look, an associated light source, a texture, or a material. The first partition criterion may include one or more of an object name, an object type, a geometry name, a part name, a material, or a proximity characteristic.

Systems and computer-readable storage media for partitioning a set of animation objects using a dependency graph are also described.

BRIEF DESCRIPTION OF THE FIGURES

The present application can be best understood by reference to the following description taken in conjunction with the accompanying drawing figures, in which like parts may be referred to by like numerals.

FIG. 9 illustrates an exemplary computing system.

DETAILED DESCRIPTION

Figure 1:
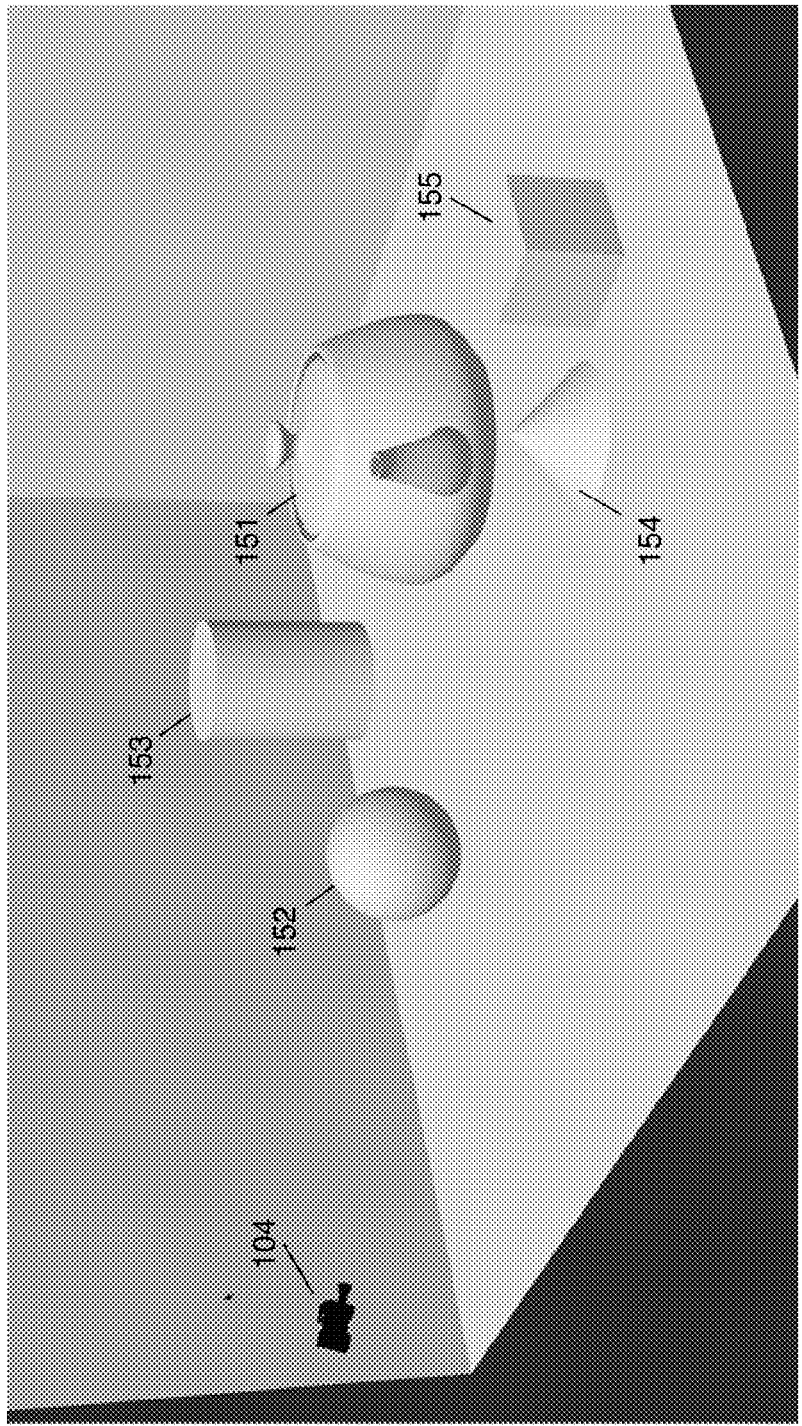
FIG. 1 depicts an exemplary computer-generated scene having multiple computer-generated objects positioned in a three-dimensional space.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

Various embodiments are described below relating to a render setup graph for configuring and managing lighting configuration data as well as external processes used to render a computer-generated image. The render setup graph may include a dependency graph having nodes interconnected by edges along which objects and object configuration data may be passed between nodes. The nodes may be used to provide a source of objects and object configuration data, configure visual effects of an object, partition a set of objects, call external processes, perform data routing functions within the graph, and the like. In this way, the render setup graph may advantageously be used to organize configuration data and execution of processes for rendering an image.

An organizer node may be used to partition objects within the render setup graph based on attributes of the objects and/or associated configuration data. Since similar visual effects are often applied to groups of objects that share a common attribute, such as object type, location, or the like, the organizer node allows the animator or other user to select objects based on these attributes. Thus, the animator or other user may select objects within the render setup graph without having to explicitly reference each object, obviating the need to modify the graph as the objects on which the graph operates change.

As mentioned above, a computer-generated animation is typically created by rendering a sequence of images, with each image depicting a computer-generated scene composed of one or more computer-generated objects. Light sources, materials, textures, and other visual effects may be associated with the computer-generated objects to create a realistic visual appearance for the computer-generated scene. For purposes of this discussion, a computer-generated scene generally refers to the three-dimensional space that may be filmed using a virtual camera, and may also be referred to generically as a scene.

FIG. 1 depicts an exemplary computer-generated scene 100 having multiple computer-generated objects positioned in a three-dimensional space. The scene 100 includes surface models of a teapot 151, a sphere 152, a cylinder 153, a cone 154, and a cube 155. In a typical computer animation, the computer-generated objects include one or more computer-animated characters that have been posed or manipulated for purposes of generating a computer-animated film sequence. In this example, the computer-generated objects include surface models defined using one or more geometric surfaces. In other examples, the computer-generated objects may be defined using solid geometry or other three-dimensional modeling techniques.

As shown in FIG. 1, a virtual camera 104 is positioned to view a portion of the scene 100. Typically, the virtual camera 104 has a field of view that is defined by a camera frustum that projects away from the lens of the virtual camera 104. In other words, computer-generated objects that are outside of the camera frustum are not seen by the camera. The positions of the virtual camera 104 and computer-generated objects 151-155 in the scene 100 are typically determined by a human operator, such as an animator or director.

Figure 2:
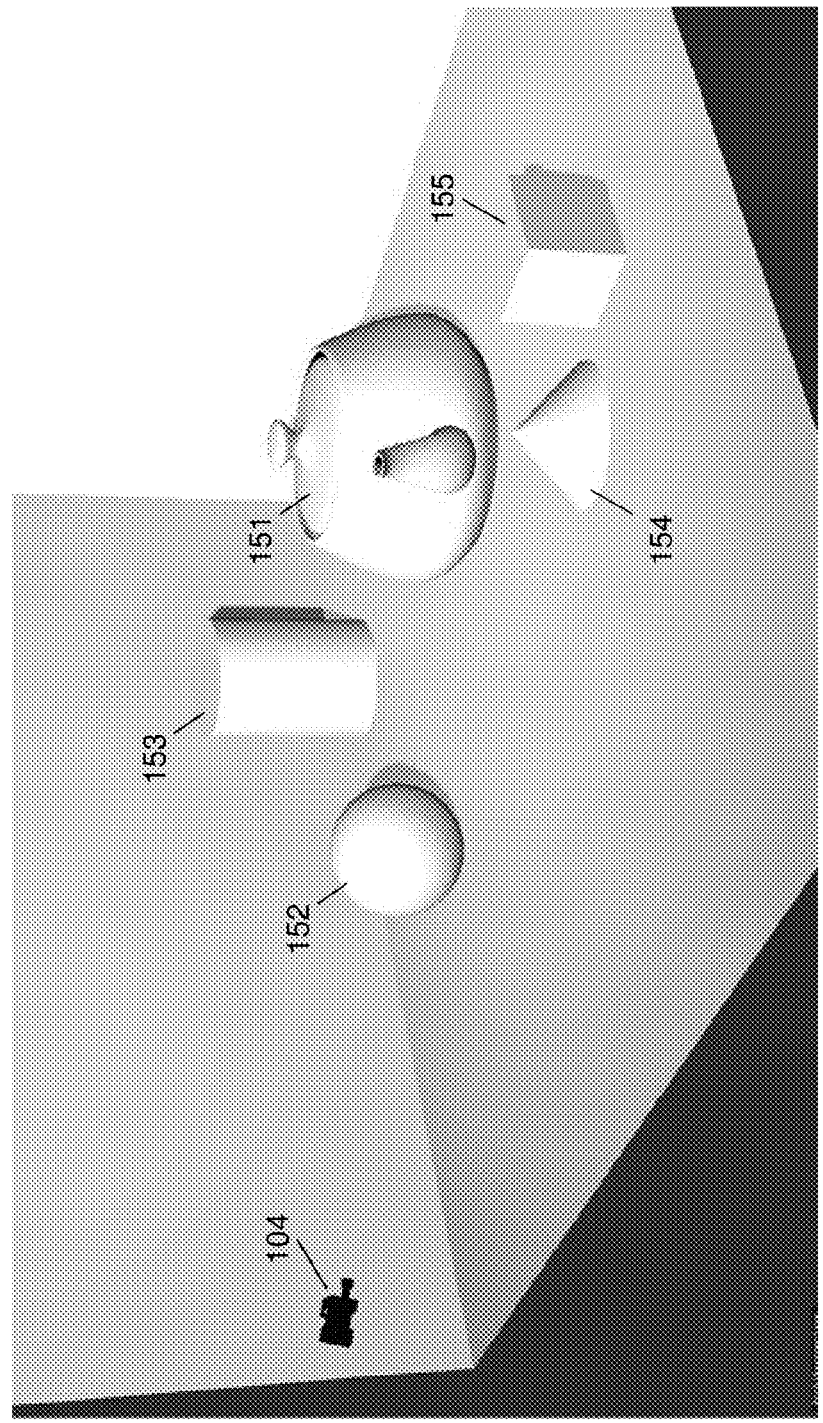
FIG. 2 depicts the scene of FIG. 1 with lighting effects applied to the computer-generated objects.

As described in more detail below, lights and other visual effects may also be applied to the scene 100 to give it a more realistic appearance. FIG. 2 depicts the scene 100 with lighting effects applied to each of the computer-generated objects 151-155. As shown in FIG. 2, the computer-generated objects have been illuminated by a diffuse light source so that the computer-generated objects 151-155 are illuminated from the camera-side. Each computer-generated object 151-155 is shaded in accordance with the diffuse light source and casts a shadow on the floor and walls of the scene 100. The scene 100 is also illuminated by one or more ambient light sources to provide an overall illumination lighting effect to the scene 100. Other light sources that can be used to illuminate the scene 100 include, for example, point lights, spot lights, and area lights.

Figure 3:
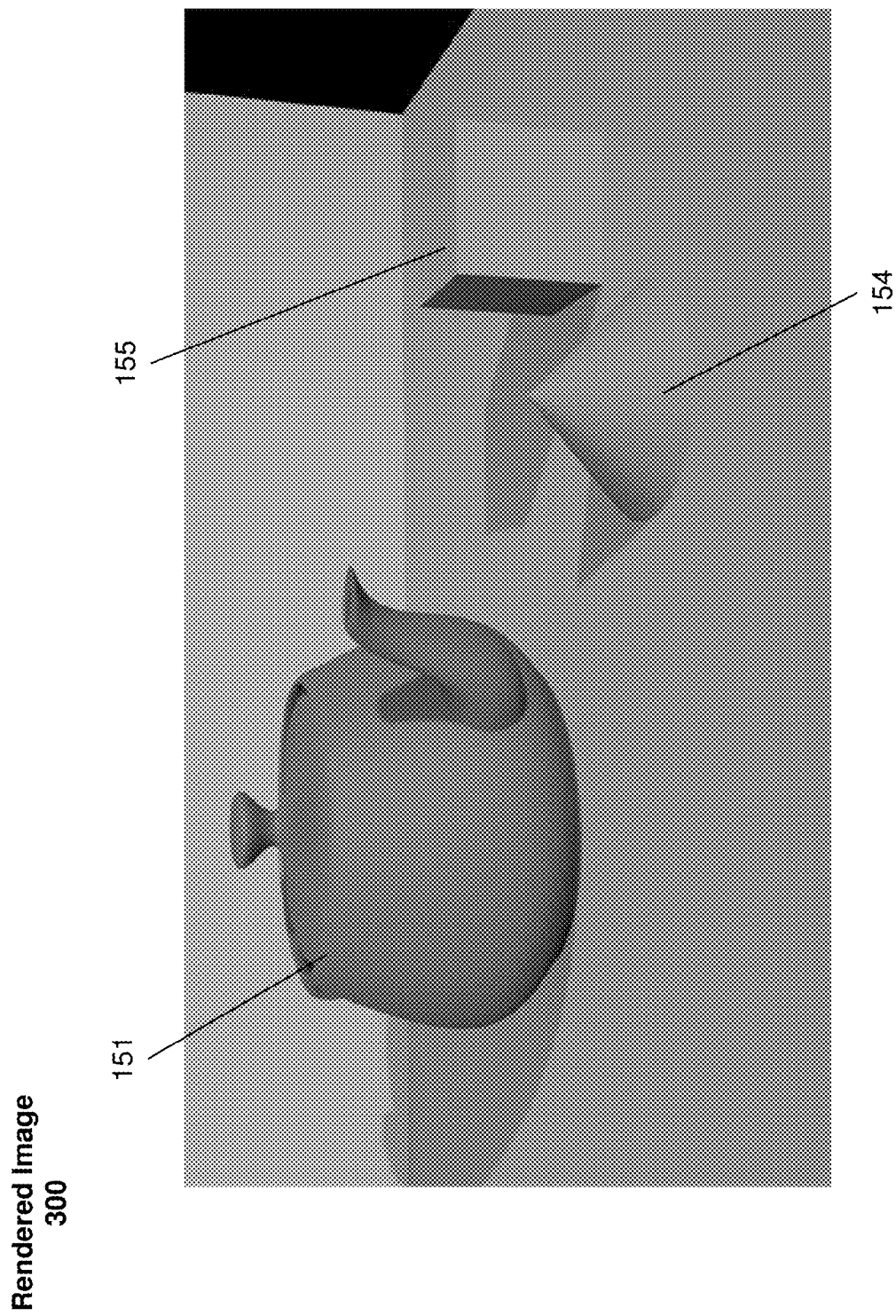
FIG. 3 depicts a rendered image of a portion of the scene of FIG. 2 as viewed by a virtual camera.

FIG. 3 depicts a rendered image 300 of the portion of the scene 100 as viewed by the virtual camera 104. As shown in FIG. 3, the rendered image 300 depicts a subset of the computer-generated objects including teapot 151, cone 154, and cube 155. The computer-generated objects 151, 154, 155 in FIG. 3 have been rendered using multiple light sources and one or more types of surface shaders for each computer-generated object to produce a realistic-looking image of the scene 100. Surface shaders may be used to simulate the optical properties of the surface of the computer-generated objects and define the color, texture, specular properties, and other optical characteristics of the surface of the computer-generated objects. A surface shader may use a bidirectional reflectance distribution function (BRDF) or other technique for simulating the reflection of light incident on a computer-generated surface. The surface shaders may also be used to define a group of optical properties to simulate a material (e.g., fur, skin, or metal). Typically, the configuration of the light sources, surface shaders, and surface materials are configurable for each computer-generated scene and may be referred to generally as a lighting configuration.

The lighting configuration may be designated on an object-by-object basis or by set of objects identified by a shared attribute. For example, as mentioned above, the scene 100 includes a diffuse light source associated with all objects in the scene 100. Additionally, a spotlight may later be associated with only the cone 154 in the foreground of the scene 100, causing the spotlight to illuminate the cone 154 and not the other objects 151, 155. This approach provides the animator or lighter with more flexibility when configuring the visual effects in a scene, but can make it difficult to manage a large number of computer-generated objects and their associated visual effects.

Figure 4:
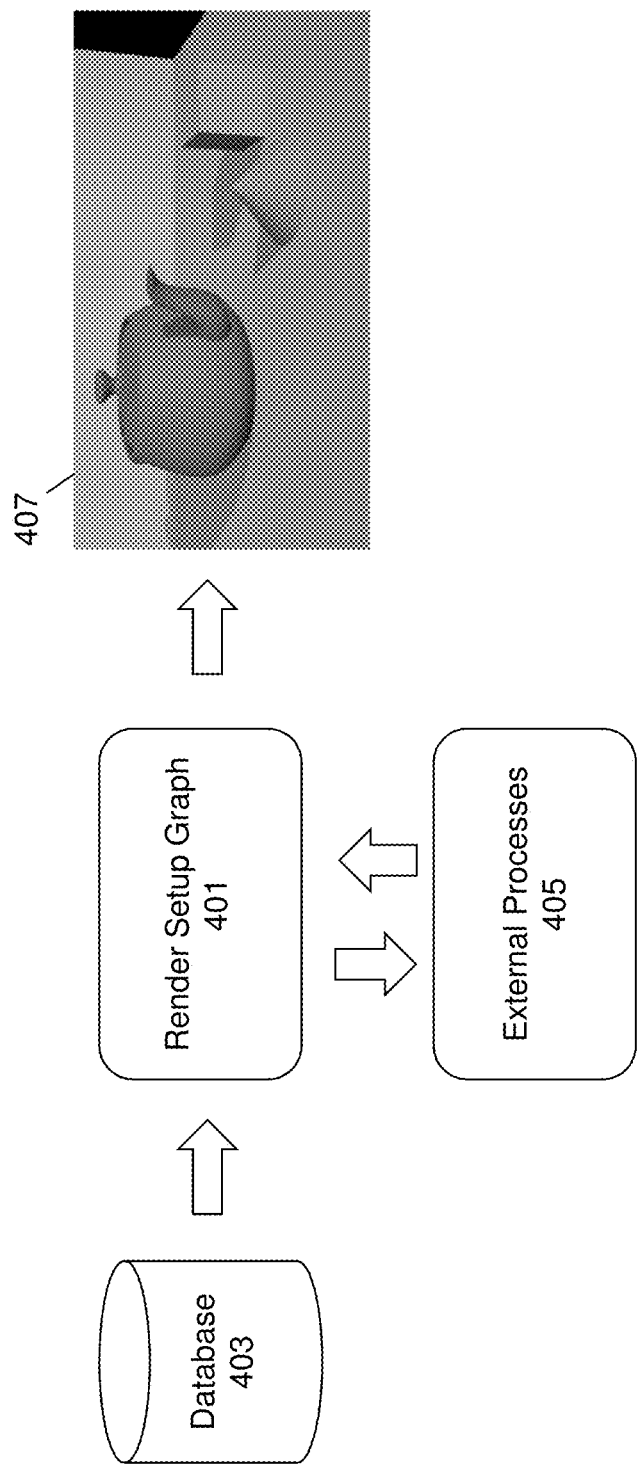
FIG. 4 illustrates the operation of an exemplary render setup graph used to render an image according to various embodiments.

FIG. 4 illustrates the operation of an exemplary render setup graph 401 that can be used to configure and manage lighting configuration data as well as external processes used to render the computer-generated image 407 of FIG. 3. Render setup graph 401 may receive data, such as animation objects, object configuration data, and the like from database 403, which may include a centralized or decentralized computer-storage database made up of one or more local and/or remote computer-storage databases that can be accessed by one or more users. Using a centralized storage may improve storage efficiency and help ensure that the rendering of a computer-generated animation is performed using a common version of the computer-generated objects.

The object data received from the database 403 may include data in any format that represents the set of objects (e.g., characters, plants, buildings, etc.) that may be used to render an image. For example, the object data may include surface and/or volumetric representations of the objects, identification of parts that make up the objects, and the like. In some examples, the set of objects may include objects that are to be displayed within an image as well as those contained in the database that are not displayed within the image.

The object configuration data may include visual properties, such as materials, textures, and the like that may be associated with the surfaces of the parts of the objects. The object configuration data may also include any number of "looks" that have been defined for the object. The looks may include specific configurations of visual properties that have been assigned to the surfaces of the object. For example, a chair object may have a first look that assigns a pine wood material to each piece of the chair and a second look that assigns a maple wood material to each piece of the chair. Any number of looks may be defined for each object and may be included within the object configuration data provided by the database 403. Thus, in some examples, the data provided by database 403 may include a set of configured computer-generated objects, where each member of the set represents an object configured to have a particular look.

Render setup graph 401 may include a dependency graph having nodes interconnected by edges along which objects and object configuration data may be passed between nodes. For example, the output of a node may include one or more objects and associated configuration data (or identifiers for one or more objects and associated configuration data). The input of a node may include a reference to one or more outputs of another node through which the node may receive the object and object configuration data. In this way, the nodes may be used to provide a source of objects and object configuration data, configure visual effects of an object, partition a set of objects, call external processes 405, perform data routing functions within the graph, and the like. Render setup graph 401 may provide object data, object configuration data, and any other required data to external processes 405. The results of external processes 405 may be returned to render setup graph 401. The evaluation of render setup graph 401 and the execution of associated external processes 405 may produce a computer-generated image 407 like that shown in FIG. 3.

Figure 5:
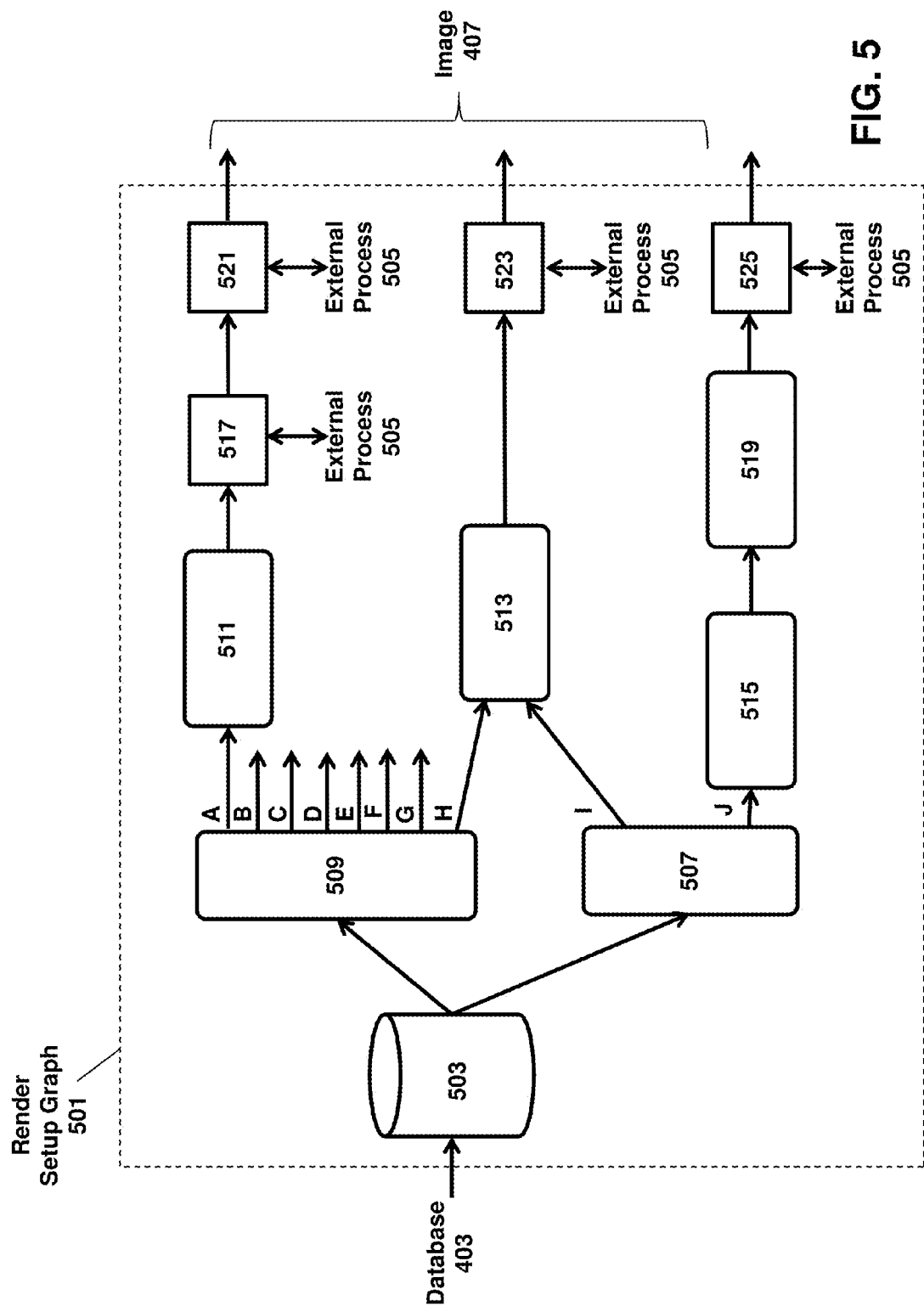
FIG. 5 illustrates an exemplary render setup graph according to various embodiments.

FIG. 5 illustrates a more detailed view of a visual representation of an exemplary render setup graph 501, which is an example graph that may be used as render setup graph 401 in FIG. 4. Generally, render setup graph 501 may receive objects and object configuration data as input from a database (e.g., database 403) and may call external processes 505 to produce a computer-generated image (e.g., image 407). Render setup graph 501 may be displayed on a computer display and manipulated using a graphical user interface and computer I/O hardware. In this way, render setup graph 501 may be generally configurable by an animator, lighter, or other user and may be used to configure and manage lighting configuration data as well as external processes used to render a computer-generated image.

As shown in FIG. 5, render setup graph 501 may include a dependency graph having one or more nodes (e.g., nodes 503, 507, 509, 511, 513, 515, 517, 519, 521, 523, and 525) interconnected by edges. The nodes may perform various functions depending on the node type. For example, nodes may represent a source of data, configure visual effects of an object, partition a set of objects, call external processes, perform data routing functions within the graph, and the like. The data output by a node may be conveyed to downstream nodes along edges connecting the nodes.

Render setup graph 501 may include various types of nodes to perform any desired function. One example node type that may be included within render setup graph 501 is an object source node (e.g., node 503) representative of a set of configured computer-generated objects (e.g., objects and their associated object configuration data) that are to be used by render setup graph 501 and that may be provided by a local or remote database similar or identical to database 403, discussed above. In some examples, the set of configured computer-generated objects represented by the source node can be assigned by the user. For example, to render a particular image, the user may select a render setup graph 501 and a set of objects to be operated on using the render setup graph 501. In this way, the render setup graph 501 is not constrained to a particular set of objects and can be used to render any desired image.

Alternatively, the object source node may include reference information that identifies the objects to be used by render setup graph 501. In some examples, the objects may be referenced by an identification of a storage location containing those objects. For example, the object source node may include a reference to one or more local or remote databases (e.g., database 403) that contain the objects to be used by render setup graph 501. In this way, the objects to be used by render setup graph 501 may be added, deleted, or modified at the source database(s) and may be used by the render setup graph 501 without having to modify render setup graph 501 to specifically reference the newly added or modified objects. In other examples, the object source node may include unique identifiers that individually reference the objects to be used by render setup graph 501. For example, if each object is given a unique name or identifier, the object source node may include a list of object names or unique identifiers to define the set of objects to be used by render setup graph 501. The object source node may output the set of referenced objects (and associated object configuration data) along one or more edges to one or more connected nodes. For example, object source node 503 may provide the set of objects and associated object configuration data contained in database 403 to nodes 507 and 509.

Another type of node that may be included within render setup graph 501 is an organizer node (e.g., nodes 507 and 509) that may be used to partition a set of objects (and associated object configuration data) received at the input of the organizer node. The input of the organizer node may include a reference identifying the objects and associated configuration data produced at the output of a preceding node. The organizer node may be configured to partition received objects based on any one or more attributes of the objects or associated configuration data, such as object name, object type, geometry name, part name, material, proximity characteristics (e.g., objects within camera frustum, distance from object/camera, existence within a region, or the like) with a time-based limitation (e.g., a time value or range that the position of the object is evaluated), screen projection with a time-based limitation (e.g., a time value or range that the position of the object is evaluated), or the like. The objects may be partitioned in such a way that objects satisfying the criterion established by the object or configuration data attribute may be grouped in one subset, while objects that do not satisfy the criterion are grouped in another subset. For the time-based limitations, the organizer node may be configured such that the time-based criterion is met if the criterion is met for the entire time range or if the criterion is met at any time within the range.

Figure 6:
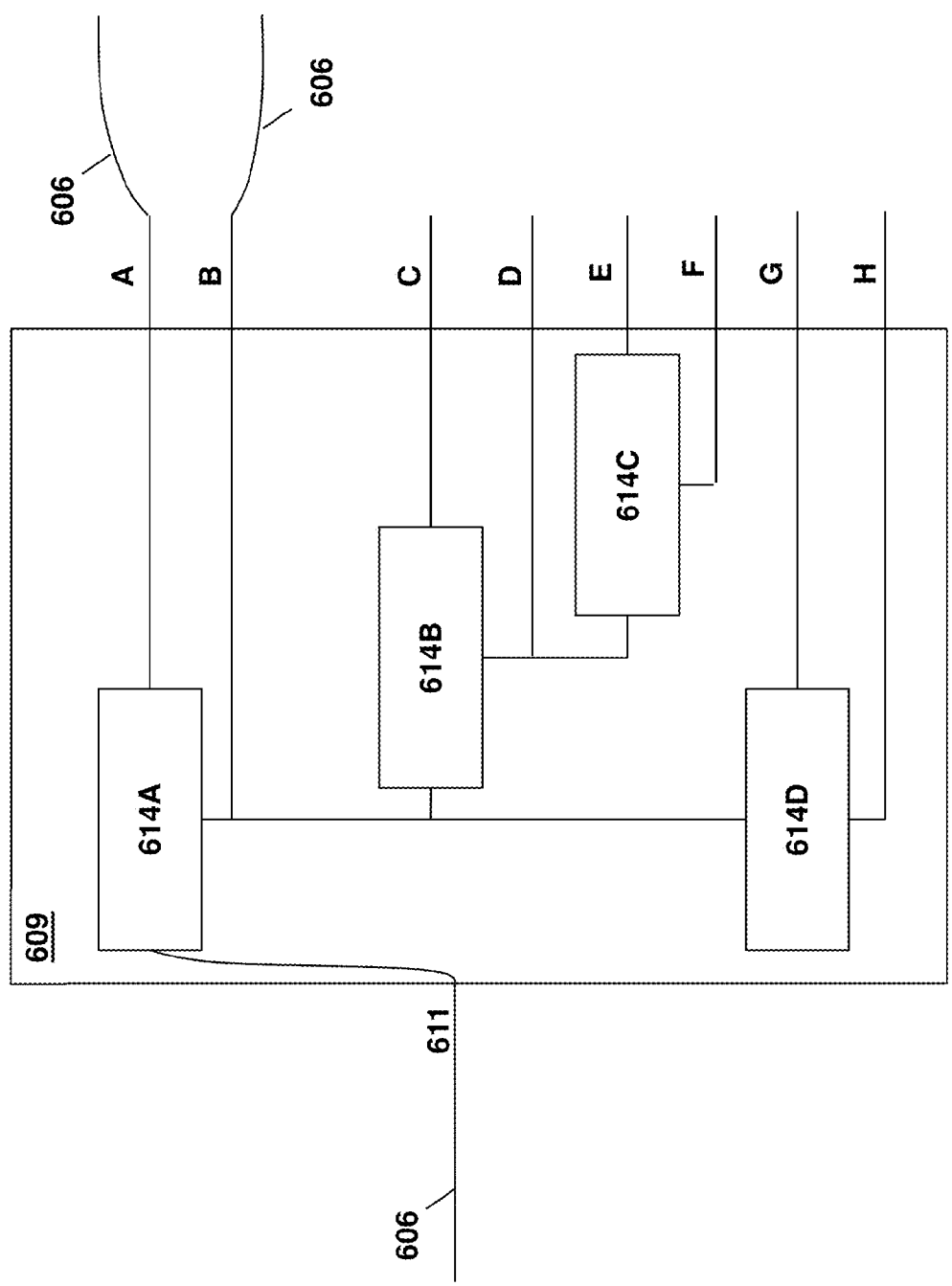
FIG. 6 depicts a schematic representation of an exemplary organizer node.

For example, FIG. 6 depicts a schematic representation of an exemplary organizer node 609 that can be used as organizer node 509 in render setup graph 501. In a typical implementation, the organizer node 609 receives a set of objects and associated configuration data from one or more upstream nodes at input 611. The organizer node 609 may partition the input set of objects into one or more subsets of objects by evaluating one or more partition criteria 614A-D. Each partition criterion 614A-D may include one or more logical operations that can be used to identify or select a subset of partition objects. The subset of partition objects may then be provided on a respective output A-H of the organizer node 609 as a partition and connected to a downstream node using node edges 606.

For example, partition criterion 614A may include a partition criterion to partition all objects (and associated object configuration data) having an object type of "chair." Thus, in this example, the organizer node 609 may evaluate metadata associated with the set of objects received at input 611 and may generate a subset of objects containing all chair-type objects that were received by the organizer node 609. This subset of objects may be output at output B.

In some examples, the organizer node 609 may generate two outputs for each partition criterion defined for that node. The first output may include the subset of objects (which may include zero, some, or all of the received set of objects) that satisfy the partition criterion, while the second output may include the subset of objects that do not satisfy the partition criterion. For example, continuing with the example provided above, organizer node 609 (corresponding to node 509 in FIG. 5) may be coupled to receive the set of objects contained in database 403 from object source node 503. Organizer node 609 may include partition criterion 614A for partitioning all objects (and associated object configuration data) having an object type of "chair." Thus, organizer node 609 may evaluate metadata associated with the set of objects received at the input of organizer node 609 and output the set of chair-type objects at output B. Organizer node 609 may further output the set of remaining objects (e.g., non-chair objects) and associated object configuration data at output A.

In some examples, the partition criteria of organizer node 609 may be hierarchical, meaning that one partition criterion may be used to partition the result of another partition criterion. For example, organizer node 609 may include partition criterion 614B that receives the subset of objects satisfying the partition criterion 614A, and further partitions that subset based on its own partition criterion. For example, continuing with the example above, partition criterion 614A may be used to partition the subset of objects having an object type of "chair." Partition 614B may further partition the subset of chair objects received from partition 614A to include objects that are located within a defined region of a scene at a particular time. Thus, organizer node 609 may output all chair objects (and associated configuration data) received at the input 611 of organizer node 609 at output B, all non-chair objects (and associated object configuration data) at output A, all chair objects (and associated object configuration data) located within the defined region of the scene at the particular time at output D, and all chair objects (and associated object configuration data) that are not located within the defined region of the scene at the particular time at output C. Organizer node 609 may further include additional partition criteria 614C and 614D and may output subsets of objects and associated configuration data at outputs E-H in a similar fashion. It should be appreciated that while four partition criteria are shown, any number of partition criteria may be included within an organizer node.

Partitioning objects based on object and configuration data attributes advantageously allows an animator, lighter, or other user to select objects having a desired characteristic, without requiring the user to individually identify the selected objects. This obviates the need to modify the render setup graph 501 when the objects in the set of input objects are modified, added, or deleted. For example, if an additional chair object is added to the scene, the organizer node 509 may identify this newly added chair object and output it along with the previously defined chair objects at output A without any additional input from the user.

Another type of node that may be included within render setup graph 301 is a merge node (e.g., node 513) that may be used to output the aggregate of all inputs received by the merge node. For example, merge node 513 may receive output H from organizer node 509 and output I from organizer node 507. Merge node 513 may combine these sets of objects and may output the set of objects that includes all of H and all of I. In some examples, duplicate objects between the inputs of the merge node may be discarded such that only one of each object exists at the output. In other examples, duplicate objects between the inputs of the merge node may not be discarded such that the output of the merge node may include multiple instances of the same object.

Another type of node that may be included within render setup graph 501 is a look selector node that may be used to select a particular "look" for an object. As mentioned above, the object configuration data passed between nodes may include looks that were defined for the associated object. For example, a chair object may have a first look that assigns a pine wood appearance to each piece of the chair and a second look that assigns a maple wood appearance to each piece of the chair. The look selector node may be used to select a look for the one or more objects received by the node and may output the one or more objects configured to have the selected look.

For example, node 511 may be a look selector node and may be configured to select a high-quality look for the objects received from output A of organizer node 509. This may be used, for example, because the objects received from output A of organizer node 509 appear in the foreground of the scene, and thus should appear with a higher level of detail. Look selector node 511 may then output the objects received from output A of organizer node 509 with the high-quality look selected.

Another type of node that may be included within render setup graph 501 is a light node that may be assigned to illuminate one or more objects and which may be configured such that some other set of objects casts shadows due to that light. The light node may correspond to one or more light sources, such as ambient light sources, point light sources, spotlights, and the like. The light node may be configured to cast shadows by the object(s) received as its input. In an organizer node, a light can also be assigned to illuminate one or more objects. These shadow casting objects may then cast shadows within a scene when these assigned light sources fall on them. For example, node 515 may be a light node configured to cast a shadow due to a point light source falling on the objects received from output J of organizer node 507. As a result, the objects received from output J of the organizer node 507 may cast shadows from the point light source associated with node 515 when the objects are rendered. To assign light sources to illuminate an object, an organizer node may be used. In particular, the light source may be associated with the organizer node and may be assigned to illuminate the objects of one or more of the outputs of the organizer node.

Another type of node that may be included within render setup graph 501 is a material node that may be used to assign a material to an object. The material node may assign a material to the surface of an entire object or only a portion of the object. For example, a material node may be used to assign a material type of brass to a doorknob of a door or may be used to assign a material type of oak to an entire chair. Alternatively, the material nodes may simply represent a material and may be linked to an organizer node. In these examples, the organizer node may be further configured to assign the material associated with the linked material node to one or more of the outputs of the organizer node.

Another type of node that may be included within render setup graph 501 is a map node that may be used with light and material nodes. The map node may specify a texture to be used by the light or material, but is not directly assigned as part of the configuration. Instead, the texture is applied to the light or material by virtue of the map node being linked with the node associated with the light or material.

Another type of node that may be included within render setup graph 501 is a generic node that may be used to encapsulate a process that has not been predefined. These nodes may be associated with a command manually entered by the user to provide flexibility to the graph by allowing users to perform functions that were not explicitly provided by the graph.

Another type of node that may be included within render setup graph 501 is a pass node (e.g., 517, 521, 523, and 525) that may be used to call external processes, such as rendering processes, translucency processes, shading processes, rasterizing processes, shadowing processes, reflection processes, transmission processes, and the like. Pass nodes may include an instruction to perform an external process using objects and object configuration data received by the pass node. For example, the pass nodes may include a reference to the external processes to be performed and may pass the data received by the pass node to the external process. The pass node may receive the output of the external process after the process is executed, and may, in turn, output that result to other nodes within the render setup graph 501 or may output the result of the external process as an output of the render setup graph 501.

For example, node 517 may be a translucency pass node configured to call an external translucency process 505. As such, node 517 may pass the objects (and associated object configuration data) to the external translucency process 505 and may receive the result of the execution of that process. Node 517 may then output the result of the external translucency process 505 to another pass node 521 within render setup graph 501. This pass node 521 may be, for example, a shade pass node configured to call an external shading process 505. As such, node 521 may pass the output of the translucency pass node 517 to the external shading process 505 and may receive the result of the execution of that process. The result of the shading process 505 may then be output by the render setup graph 501 as part of image 407. Similarly, the outputs of pass nodes 523 and 525 may call their respective external processes 505 and may output by the render setup graph 501 as part of image 407.

While specific types of nodes are provided above, it should be appreciated that render setup graph 501 may include other types of nodes, such as splitter nodes, other routing nodes, for-loop nodes, group nodes (representing two or more nodes to avoid screen clutter), and the like. These other nodes can be combined with those discussed above to allow an animator, lighter, or other user to configure, document, and visualize the processes to be performed and the dependencies of these processes on other processes and configuration data. Moreover, while a specific arrangement of a render setup graph is provided above, it should be appreciated that a render setup graph may include additional or fewer nodes arranged in any configuration as appropriate to generate a desired image or animation.

Using a render setup graph similar or identical to that described above advantageously allows the animator or lighter to abstractly define the objects to be used, configure visual effects of these objects (e.g., lighting effects), quickly identify dirty data that should be updated, and define the flow of processes to be performed in a manner that is independent of the objects being input into the graph. Additionally, the render setup graph provides the animator, lighter, or other user with the ability to define and configure rendering passes without having to work on the entire scene. The render setup graph may also allow the animator, lighter, or other user to work with a simplified version of the scene that may omit resource intensive visual effects that are used in the final production rendering pass.

Figure 7:
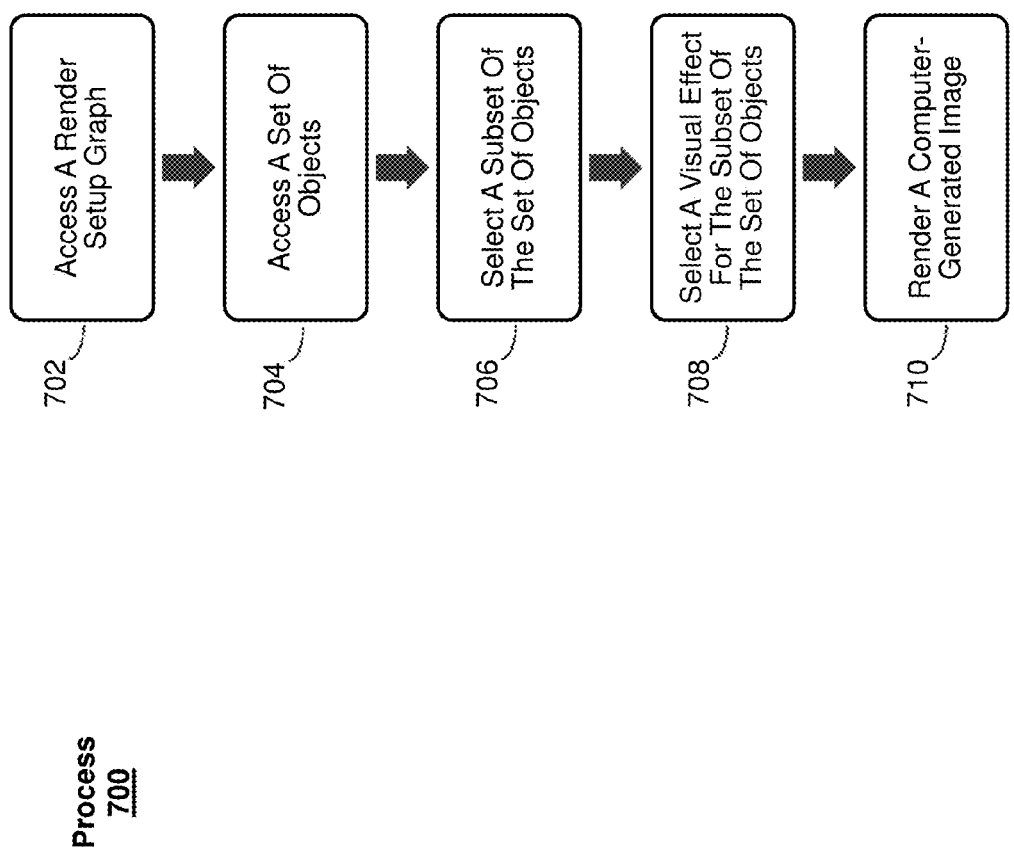
FIG. 7 illustrates an exemplary process for rendering an image using a render setup graph according to various embodiments.

FIG. 7 illustrates an exemplary process 700 for rendering an image using a render setup graph similar or identical to graph 501, discussed above. At block 702, a render setup graph may be accessed. For example, a processor may access a local or remote database containing a render setup graph (e.g., a graph similar or identical to render setup graph 401 or 501) that was generated to render a particular image or animation. The render setup graph may include nodes interconnected by edges that define the objects to be used in the rendering process, the configurations for the visual effects of those objects, and the external processes to be executed on those objects.

At block 704, a set of animation objects may be accessed. Object configuration data that are associated with the objects, such as the visual properties and looks for an object, may also be accessed. In some examples, the set of objects may be defined by the user. For example, to render a particular image, the user may select the render setup graph to be accessed at block 702 and a set of objects to be operated on using that render setup graph. In this way, the render setup graph is not constrained to a particular set of objects and can be used to render any desired image. The user-selected objects may be accessed by a processor from a database similar or identical to database 403 and provided to the render setup graph at one or more object source nodes similar or identical to object source node 503.

Alternatively, the set of objects may be defined by the render setup graph. The render setup graph may define the objects to be accessed using an object source node similar or identical to object source node 503 discussed above. In some examples, the object source node may include one or more references that define the set of objects abstractly, for example, by identifying one or more storage locations of the objects. In this way, objects to be used by the render setup graph may be modified, added, or deleted without having to modify the render setup graph. In other examples, the object source node may include one or more references that explicitly define the objects to be used by individually identifying the objects (e.g., by using a unique identifier). Depending on the way the objects are defined by the object source node, a processor may access the objects by querying a local or remote database using the object identifiers or the location identifiers. For example, if render setup graph 501 was accessed at block 702, the set of objects and associated object configuration data to be accessed at block 704 may be defined by object source node 503. In some examples, object source node 503 may define the set of objects to be used by render setup graph 501 abstractly by identifying database 403 as the source of the objects. Thus, at block 704, the objects and associated object configuration data may be accessed from database 403.

Figure 8:
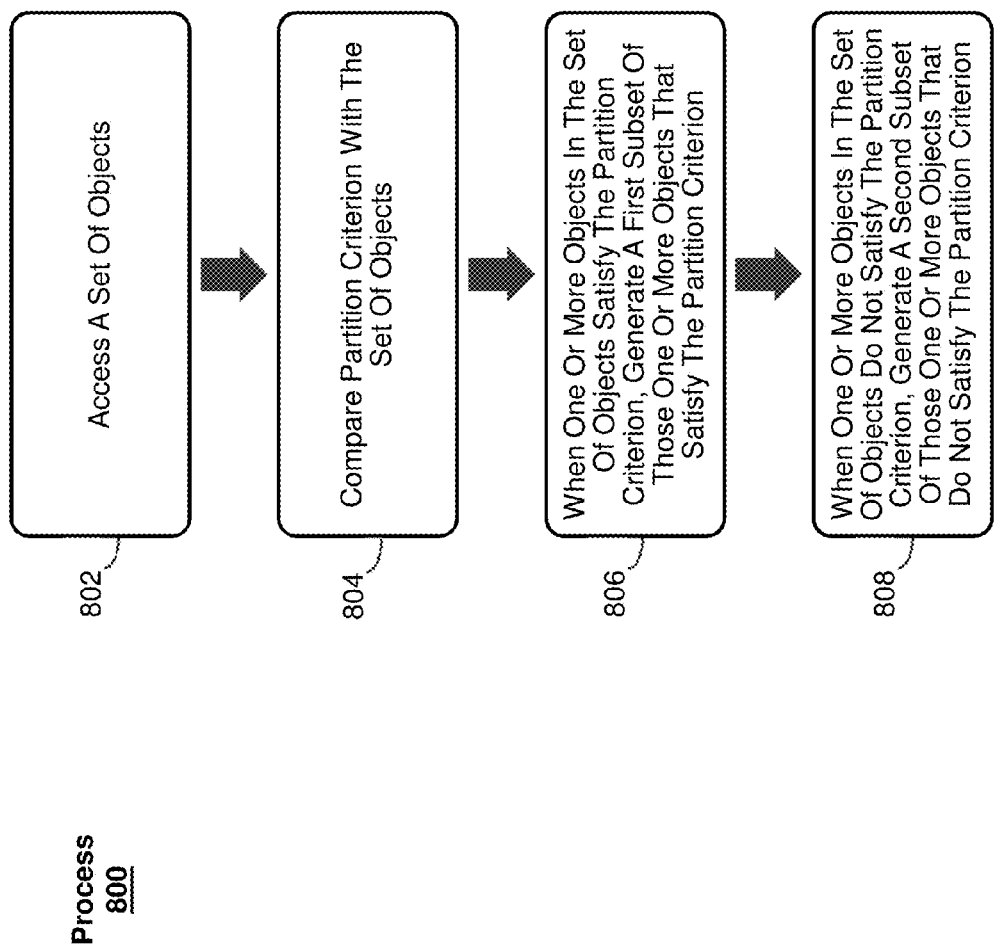
FIG. 8 illustrates an exemplary process for selecting a subset of objects from a set of objects in a render setup graph according to various embodiments.

At block 706, a subset of the set of objects accessed at block 704 may be selected based on the render setup graph. To select or define the subsets to be configured, organizer nodes similar or identical to organizer nodes 507 and 509 may be used to selectively partition subsets of objects based on any one or more attributes of the objects or associated configuration data, such as object name, object type, geometry name, part name, material, proximity characteristics (e.g., objects within camera frustum, distance from object/camera, existence within a region, or the like) with a time-based limitation, screen projection with a time-based limitation, or the like. FIG. 8 illustrates an exemplary process 800 that may be used to select the subset of the set of objects at block 706.

At block 802, a set of objects may be accessed. In some examples, the set of objects may be defined by the render setup graph accessed at block 702 of process 700. In these examples, the graph may include an organizer node similar or identical to organizer node 507 or 509 and the set of objects accessed may include the objects received at the input of the organizer node. The objects to be accessed may include the objects identified by the organizer node as being received at the input of the organizer node within the render setup graph. Thus, a processor may access these objects and associated configuration data from a remote or local storage.

At block 804, the set of objects may be compared to one or more partition criteria. The one or more partition criteria may include one or more attributes of the objects or associated configuration data, such as object name, object type, geometry name, part name, material, proximity characteristics (e.g., objects within camera frustum, distance from object/camera, existence within a region, or the like) with a time-based limitation, screen projection with a time-based limitation, or the like. In some examples, the one or more partition criteria may be defined by the render setup graph accessed at block 702 of process 700. In these examples, the graph may include an organizer node similar or identical to organizer node 507 or 509 that includes the one or more partition criteria. Using the one or more partition criteria, a processor may compare the set of objects and associated configuration data accessed at block 802 to the one or more partition criteria to identify objects and associated configuration data that match the one or more partition criteria.

For example, if organizer node 509 of render setup graph 501 is used to define the set of objects accessed at block 802, the set of objects received by organizer node 509 may be compared to one or more of the partition criterion associated with that node. One example criterion that may be associated with organizer node 509 may be a partition criterion to partition all objects (and associated object configuration data) having an object type of "chair." Thus, at block 804, the set of objects received by organizer node 509 may be analyzed to determine if these objects are chair-type objects. This may include performing a text search of metadata associated with the objects of the set of objects to identify a match of the object type. In other examples, other means for identifying an object type may be used.

At block 806, when one or more objects in the set of objects accessed at block 802 satisfy the partition criterion, a first subset of objects satisfying the partition criterion may be generated. The first subset of objects may include all objects from the set of objects accessed at block 802 that satisfy the criterion as determined at block 804. The objects may be tagged or otherwise identified as being part of the same subset such that the objects in the subsets may be later identified. In the event that no objects satisfy the partition criterion, no first subset may be generated or an empty set may be generated.

At block 808, when one or more objects in the set of objects accessed at block 802 do not satisfy the partition criterion, a second subset of objects that do not satisfy the partition criterion may be generated. The second subset of objects may include all objects from the set of objects accessed at block 802 that do not satisfy the criterion as determined at block 804. The objects may be tagged or otherwise identified as being part of the same subset such that the objects in the subsets may be later identified. In some examples, block 808 may be omitted from process 800. In the event that no objects exclude the partition criterion, no second subset may be generated or an empty set may be generated.

In some examples, the organizer node used to define the partition criterion at block 804 may include more than one partition criterion. For example, the organizer node 609 in FIG. 6 includes four different partition criteria 614A-D. In these examples, process 800 may be repeated for each partition criterion. The objects accessed at block 802 during each iteration may include the objects received by the respective partition criterion 614A-D and the partition criterion used at block 804 may include the respective partition criterion 614A-D.

Returning to FIG. 7, at block 708, visual effects for the subsets of the set of objects selected at block 706 may be selected based on the render setup graph. The visual effects may include any type of visual effect, such as a look, associated light source, texture, material, or the like. Nodes, such as light nodes, material nodes, look selector nodes, and map nodes may be used to select visual effects (e.g., light sources, material properties, looks, and textures) that are to be associated with the subsets of objects. In particular, a set of objects received by one of the light nodes, material nodes, look selector nodes, map nodes, and the like, may be assigned a visual effect as defined by that node. In other examples, the light nodes and material nodes may simply represent a light source or material, respectively, and may be linked to an organizer node. In these examples, the organizer nodes may be further configured to assign materials or light sources associated with linked nodes to the objects. As a result, any subsequent process performed on those objects may be performed using the selected visual effect(s).

For example, continuing with the example provided above, render setup graph 501 may include organizer node 509 that outputs the subset of objects containing chair-type objects at output A. This subset of chair-type objects may be received by node 511, which may be a look selector node configured to select a high-quality look for the objects received at the input of the node. As a result, all processes performed on the chair-type objects output by look selector node 511 may be performed using the high-quality look (assuming that there are no intervening look selector nodes that may change the selected look).

At block 710, a computer-generated image may be rendered based on the render setup graph. Rendering the image may include performing one or more external processes on the subset of objects using the selected visual effect(s) based on the render setup graph. The external processes may include any process, such as rendering, shading, rasterizing, shadowing calculation, reflection calculation, transmission calculation, or the like that the animator, lighter, or other user may want to perform on the objects used by the render setup graph. In some examples, the render setup graph may include pass nodes similar or identical to pass nodes 517, 521, 523, and 525 that may include references to the external processes to be performed. A processor may execute the processes referenced by these pass nodes using the objects and associated configuration data received by these pass nodes. A processor may then aggregate the outputs of some or all of the pass nodes to produce a computer-generated image of a scene.

For example, continuing with the example provided above, render setup graph 501 may reference an external translucency process using pass node 517. Thus, the referenced translucency process may be performed on the subset of chair-type objects partitioned by organizer node 509 using the high-quality look selected based on look selector node 511. Render setup graph 501 further includes a pass node 521, which may reference an external shading process. As a result, the referenced shading process may be performed on the result of the translucency process performed on the subset of chair-type objects using a high-quality look. The result may be a high-quality shaded representation of the subset of chair-type objects partitioned by organizer node 509. This data may be combined with the outputs of pass nodes 523 and 525, which may output a representation of a character in the scene and the background of the scene, respectively. The processor may combine these outputs to render an image of shaded chairs, a character, and a background.

FIG. 9 illustrates an exemplary animation system 900 that can be used to implement the render setup graph discussed above. The render setup graph can be implemented, for example, in either hardware or in software stored on a non-transitory computer-readable storage medium. The system can be configured to generate, modify, and evaluate the render setup graph to configure and manage lighting configuration data as well as external processes used to render a computer-generated image. The system can be further configured to receive input from a user and to display graphics, an image, or scene of an animation based on the render setup graph.

The animation system 900 can be configured to receive user input from an input device 920. The input device 920 can be any device that receives input from the user and transmits it to the animation system 900. For example, the input device 920 can be a keyboard, a mouse, a tablet, a stylus, or the like. Those skilled in the art will recognize that other types of input devices can also be used.

The animation system 900 can be configured to output graphics, images, or animation to a display device 930. The display device 930 can include any device that receives data from the animation system and presents the data to the user. For example, the display device may include a liquid crystal display, a set of light-emitting diodes, a projector, or the like. Those skilled in the art will recognize that other types of output devices can also be used.

The animation system 900 may further include a central processing unit 902. The central processing unit may include one or more processing cores. The central processing unit 902 may be coupled to and able to communicate with the input device 920. Although the animation system 900 is illustrated with one central processing unit 902, the animation system 900 may include multiple processing units. The animation system 900 may also include a graphics processing unit 904. The graphics processing unit 904 may be dedicated to processing graphics-related data. The graphics processing unit 904 may include a single processing core or multiple processing cores. Although the animation system 900 is illustrated with one graphics processing unit 904, the animation system 900 may include a plurality of graphics processing units. The central processing unit 902 and/or the graphics processing unit 904 may be coupled to and able to communicate data to the output device 930.

In one example, the animation system 900 may include one or more processors and instructions stored in a non-transitory computer-readable storage medium, such as a memory or storage device, that when executed by the one or more processors, perform the partitioning and animation rendering using a render setup graph, as described above. In the context of the embodiments described herein, a "non-transitory computer-readable storage medium" can be any medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus- or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 900 may include volatile memory 906, which is a non-transitory computer-readable storage medium, in communication with the central processing unit 902. The volatile memory 906 may include, for example, random access memory, such as dynamic random access memory or static random access memory, or any other type of volatile memory. The volatile memory 906 may be used to store data or instructions during the operation of the animation system 900. Those skilled in the art will recognize that other types of volatile memory can also be used.

The animation system 900 may also include non-volatile memory 908, which is a non-transitory computer-readable storage medium, in communication with the central processing unit 902. The non-volatile memory 908 may include flash memory, hard disks, magnetic storage devices, read-only memory, or the like. The non-volatile memory 908 may be used to store animation data, render setup graph data, computer instructions, or any other information. Those skilled in the art will recognize that other types of non-volatile memory can also be used.

The animation system 900 is not limited to the devices, configurations, and functionalities described above. For example, although a single volatile memory 906, non-volatile memory 908, central processing unit 902, graphics processing unit 904, input device 920, and output device 930 are illustrated, a plurality of any of these devices can be implemented internal or external to the animation system 900. In addition, the animation system 900 may include a network access device for accessing information on a network, such as an internal network or the Internet. Those skilled in the art will recognize that other configurations of the animation system 900 can be used.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for partitioning a set of animation objects using a dependency graph, the method comprising:
    accessing, by one or more computer processors, a dependency graph stored in computer memory, the dependency graph comprising a plurality of interconnected nodes, wherein a first node of the plurality of interconnected nodes comprises a first partition criterion stored in computer memory;
    accessing, by the one or more computer processors, a set of animation objects stored in computer memory, the set of animation objects identified by an input of the first node;
    comparing, by the one or more computer processors, the set of animation objects stored in computer memory to the first partition criterion stored in computer memory;
    when one or more objects in the set of animation objects satisfy the first partition criterion:
        generating, by the one or more computer processors, a first subset of those one or more objects that satisfy the first partition criterion;
        storing, by the one or more computer processors, the first subset of animation objects in computer memory; and
    when one or more objects in the set of animation objects do not satisfy the first partition criterion:
        generating, by the one or more computer processors, a second subset of those one or more objects that do not satisfy the first partition criterion;
        storing, by the one or more computer processors, the second subset of animation objects in computer memory; and
    rendering, by the one or more computer processors, a portion of at least one of the first and second subsets of animation objects.

2. The computer-implemented method of claim 1, wherein the set of animation objects comprises a first set of animation objects when the input of the first node identifies the first set of animation objects as being the set of animation objects to be accessed, and wherein the set of animation objects comprises a second set of animation objects when the input of the first node identifies the second set of animation objects as being the set of animation objects to be accessed.

3. The computer-implemented method of claim 1, further comprising:
    comparing the first subset to a second partition criterion, wherein the first node further comprises the second partition criterion;
    when one or more objects in the first subset satisfy the second partition criterion, generating a third subset of those one or more objects in the first subset that satisfy the second partition criterion; and
    when one or more objects in the first subset do not satisfy the second partition criterion, generating a fourth subset of those one or more objects in the first subset that do not satisfy the second partition criterion.

4. The computer-implemented method of claim 1, further comprising:
    selecting a visual effect for the first subset; and
    rendering an image based on the first subset and the selected visual effect, wherein the plurality of interconnected nodes further comprises:
        a second node comprising the visual effect; and
        a third node comprising an instruction to render the image based on the first subset and the selected visual effect.

5. The computer-implemented method of claim 4, wherein rendering the image comprises rendering the image using a result from one or more of a rendering process, translucency process, shading process, or rasterizing process.

6. The computer-implemented method of claim 4, wherein an input of the second node identifies the first subset from a first output of the first node.

7. The computer-implemented method of claim 6, wherein an input of the third node identifies the first subset and the selected visual effect from an output of the second node.

8. The computer-implemented method of claim 4, wherein the visual effect comprises a look, an associated light source, a texture, or a material.

9. The computer-implemented method of claim 1, wherein the first partition criterion comprises one or more of an object name, an object type, a geometry name, a part name, a material, or a proximity characteristic.

10. A non-transitory computer-readable storage medium comprising computer-executable instructions for partitioning a set of animation objects using a dependency graph, the computer-executable instructions comprising instructions for:

accessing, by one or more computer processors, a dependency graph stored in computer memory, the dependency graph comprising a plurality of interconnected nodes, wherein a first node of the plurality of interconnected nodes comprises a first partition criterion stored in computer memory;

accessing, by the one or more computer processors, a set of animation objects stored in computer memory, the set of animation objects identified by an input of the first node;

comparing, by the one or more computer processors, the set of animation objects stored in computer memory to the first partition criterion stored in computer memory;

when one or more objects in the set of animation objects satisfy the first partition criterion:
   generating, by the one or more computer processors, a first subset of those one or more objects that satisfy the first partition criterion;
   storing, by the one or more computer processors, the first subset of animation objects in computer memory; and when one or more objects in the set of animation objects do not satisfy the first partition criterion:
   generating, by the one or more computer processors, a second subset of those one or more objects that do not satisfy the first partition criterion;
   storing, by the one or more computer processors, the second subset of animation objects in computer memory; and rendering, by the one or more computer processors, a portion of at least one of the first and second subsets of animation objects.

11. The non-transitory computer-readable storage medium of claim 10, wherein the set of animation objects comprises a first set of animation objects when the input of the first node identifies the first set of animation objects as being the set of animation objects to be accessed, and wherein the set of animation objects comprises a second set of animation objects when the input of the first node identifies the second set of animation objects as being the set of animation objects to be accessed.

12. The non-transitory computer-readable storage medium of claim 10, further comprising instructions for:
   comparing the first subset to a second partition criterion, wherein the first node further comprises the second partition criterion;
   when one or more objects in the first subset satisfy the second partition criterion, generating a third subset of those one or more objects in the first subset that satisfy the second partition criterion; and
   when one or more objects in the first subset do not satisfy the second partition criterion, generating a fourth subset of those one or more objects in the first subset that do not satisfy the second partition criterion.

13. The non-transitory computer-readable storage medium of claim 10, further comprising instructions for:
   selecting a visual effect for the first subset; and
   rendering an image based on the first subset and the selected visual effect, wherein the plurality of interconnected nodes further comprises:
      a second node comprising the visual effect; and
      a third node comprising an instruction to render the image based on the first subset and the selected visual effect.

14. The non-transitory computer-readable storage medium of claim 13, wherein rendering the image comprises rendering the image using a result from one or more of a rendering process, translucency process, shading process, or rasterizing process.

15. The non-transitory computer-readable storage medium of claim 13, wherein an input of the second node identifies the first subset from a first output of the first node.

16. The non-transitory computer-readable storage medium of claim 15, wherein an input of the third node identifies the first subset and the selected visual effect from an output of the second node.

17. The non-transitory computer-readable storage medium of claim 13, wherein the visual effect comprises a look, an associated light source, a texture, or a material.

18. The non-transitory computer-readable storage medium of claim 10, wherein the first partition criterion comprises one or more of an object name, an object type, a geometry name, a part name, a material, or a proximity characteristic.

19. An apparatus for partitioning a set of animation objects using a dependency graph, the apparatus comprising:
   a memory configured to store a dependency graph comprising a plurality of interconnected nodes, wherein a first node of the plurality of interconnected nodes comprises a first partition criterion stored in the memory; and
   a computer processor configured to:
      access a dependency graph stored in the memory, the dependency graph comprising a plurality of interconnected nodes, wherein a first node of the plurality of interconnected nodes comprises a first partition criterion stored in the memory;
      access a set of animation objects stored in the memory, the set of animation objects identified by an input of the first node;
      compare the set of animation objects stored in the memory to the first partition criterion stored in the memory;
      when one or more objects in the set of animation objects satisfy the first partition criterion:
         generate a first subset of those one or more objects that satisfy the first partition criterion;
         store the first subset of animation objects in the memory; and
      when one or more objects in the set of animation objects do not satisfy the first partition criterion, criterion:
         generate a second subset of those one or more objects that do not satisfy the first partition criterion;
         store the second subset of animation objects in the memory; and
      render a portion of at least one of the first and second subsets of animation objects.

20. The apparatus of claim 19, wherein the set of animation objects comprises a first set of animation objects when the input of the first node identifies the first set of animation objects as being the set of animation objects to be accessed, and wherein the set of animation objects comprises a second set of animation objects when the input of the first node identifies the second set of animation objects as being the set of animation objects to be accessed.

21. The apparatus of claim 19, wherein the computer processor is further configured to:
   compare the first subset to a second partition criterion, wherein the first node further comprises the second partition criterion;

when one or more objects in the first subset satisfy the second partition criterion, generate a third subset of those one or more objects in the first subset that satisfy the second partition criterion; and when one or more objects in the first subset do not satisfy the second partition criterion, generate a fourth subset of those one or more objects in the first subset that do not satisfy the second partition criterion.

22. The apparatus of claim 19, wherein the computer processor is further configured to:

select a visual effect for the first subset; and render an image based on the first subset and the selected visual effect, wherein the plurality of interconnected nodes further comprises:

a second node comprising the visual effect; and a third node comprising an instruction to render the image based on the first subset and the selected visual effect.

23. The apparatus of claim 22, wherein rendering the image comprises rendering the image using a result from one or more of a rendering process, translucency process, shading process, or rasterizing process.

24. The apparatus of claim 22, wherein an input of the second node identifies the first subset from a first output of the first node.

25. The apparatus of claim 24, wherein an input of the third node identifies the first subset and the selected visual effect from an output of the second node.

26. The apparatus of claim 22, wherein the visual effect comprises a look, an associated light source, a texture, or a material.

27. The apparatus of claim 19, wherein the first partition criterion comprises one or more of an object name, an object type, a geometry name, a part name, a material, or a proximity characteristic.

28. The computer-implemented method of claim 1, further comprising:

associating the objects of the first subset with a first identifier;

associating the objects of the second subset with a second identifier;

determining whether a received user input represents a selection associated with the first identifier or the second identifier;

in accordance with a determination that the user input represents a selection associated with the first identifier, displaying objects or configuration data associated with the first identifier;

in accordance with a determination that the user input represents a selection associated with the second identifier, displaying objects or configuration data associated with the second identifier.

29. The non-transitory computer-readable storage medium of claim 10, further comprising instructions for:

associating the objects of the first subset with a first identifier;

associating the objects of the second subset with a second identifier;

determining whether a received user input represents a selection associated with the first identifier or the second identifier;

in accordance with a determination that the user input represents a selection associated with the first identifier, displaying objects or configuration data associated with the first identifier;

in accordance with a determination that the user input represents a selection associated with the second identifier, displaying objects or configuration data associated with the second identifier.

30. The apparatus of claim 19, wherein the computer processor is further configured to:

associate the objects of the first subset with a first identifier;

associate the objects of the second subset with a second identifier;

determine whether a received user input represents a selection associated with the first identifier or the second identifier;

in accordance with a determination that the user input represents a selection associated with the first identifier, display objects or configuration data associated with the first identifier;

in accordance with a determination that the user input represents a selection associated with the second identifier, display objects or configuration data associated with the second identifier.

* * * * *